(12) United States Patent
Wala et al.

(10) Patent No.: US 9,001,811 B2
(45) Date of Patent: Apr. 7, 2015

(54) METHOD OF INSERTING CDMA BEACON PILOTS IN OUTPUT OF DISTRIBUTED REMOTE ANTENNA NODES

(75) Inventors: Philip M. Wala, Waseca, MN (US); Dean Zavadsky, Shakopee, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 624 days.

(21) Appl. No.: 12/468,122

(22) Filed: May 19, 2009

(65) Prior Publication Data

US 2010/0296458 A1    Nov. 25, 2010

(51) Int. Cl.
| | |
|---|---|
| H04B 7/14 | (2006.01) |
| H04B 7/216 | (2006.01) |
| H04W 4/00 | (2009.01) |
| H04B 1/707 | (2011.01) |
| H04B 7/06 | (2006.01) |

(Continued)

(52) U.S. Cl.
CPC ...... *H04B 1/707* (2013.01); *H04B 2201/70701* (2013.01); *H04W 88/085* (2013.01); *H04B 7/0671* (2013.01); *H04W 16/26* (2013.01)

(58) Field of Classification Search
USPC .......................................................... 370/342
See application file for complete search history.

(56) References Cited

U.S. PATENT DOCUMENTS

| | | |
|---|---|---|
| 3,845,487 A | 10/1974 | Lammers |
| 3,931,473 A | 1/1976 | Ferris, Jr. |
| 4,101,834 A | 7/1978 | Stutt et al. |

(Continued)

FOREIGN PATENT DOCUMENTS

| | | |
|---|---|---|
| CA | 2008900 | 1/1998 |
| DE | 3707244 A | 9/1988 |

(Continued)

OTHER PUBLICATIONS

Wala, "A New Microcell Architecture Using Digital Optical Transport", "Proceedings of the Vehicular Technology Conference", May 18, 1993, pp. 585-588, Publisher: IEEE, Published in: US.

(Continued)

*Primary Examiner* — Ian N Moore
*Assistant Examiner* — Jenee Williams
(74) *Attorney, Agent, or Firm* — Fogg & Powers LLC (57) ABSTRACT

A communication system to feed remote antenna nodes with simulcast traffic and non-simulcast beacons is provided. The communication system includes a host radio frequency (RF) digitizer, a delay buffer, a summing circuit, and a framer/serializer. The host RF digitizer receives CDMA base station signals for simulcast CDMA-traffic-bearing channels and to output digital samples. The delay buffer is communicatively coupled to receive the samples output from a beacon pilot generator and to output digitally delayed CDMA-digital-beacon-pilot samples having different pseudo-noise offsets. The summing circuit adds the CDMA-digital-beacon-pilot samples having different pseudo-noise offsets to the digital samples received from the host RF digitizer to form composite simulcast-plus-uniquely-offset-beacon-pilot CDMA samples. The framer/serializer is communicatively coupled to receive the composite simulcast-plus-uniquely-offset-beacon-pilot CDMA samples, and to route the composite simulcast-plus-uniquely-offset-beacon-pilot CDMA samples to an associated remote antenna node.

18 Claims, 7 Drawing Sheets

(51) Int. Cl.
*H04W 16/26* (2009.01)
*H04W 88/08* (2009.01)

(56) References Cited

U.S. PATENT DOCUMENTS

| | | |
|---|---|---|
| 4,106,023 A | 8/1978 | Baghdady |
| 4,112,488 A | 9/1978 | Smith, III |
| 4,144,409 A | 3/1979 | Utano et al. |
| 4,144,411 A | 3/1979 | Frenkiel |
| 4,183,054 A | 1/1980 | Patisaul et al. |
| 4,231,116 A | 10/1980 | Sekiguchi et al. |
| 4,244,046 A | 1/1981 | Brouard et al. |
| 4,354,167 A | 10/1982 | Terreault et al. |
| 4,402,076 A | 8/1983 | Krajewski |
| 4,433,335 A | 2/1984 | Wind |
| 4,451,699 A | 5/1984 | Gruenberg |
| 4,451,916 A | 5/1984 | Casper et al. |
| 4,456,793 A | 6/1984 | Baker et al. |
| 4,475,010 A | 10/1984 | Huensch et al. |
| 4,485,486 A | 11/1984 | Webb et al. |
| 4,525,861 A | 6/1985 | Freeburg |
| 4,531,239 A | 7/1985 | Usui |
| 4,556,760 A | 12/1985 | Goldman |
| 4,596,051 A | 6/1986 | Feldman |
| 4,611,323 A | 9/1986 | Hessenmüller |
| 4,612,990 A | 9/1986 | Shu |
| 4,628,501 A | 12/1986 | Loscoe |
| 4,654,843 A | 3/1987 | Roza et al. |
| 4,667,319 A | 5/1987 | Chum |
| 4,669,107 A | 5/1987 | Eriksson-Lennartsson |
| 4,691,292 A | 9/1987 | Rothweiler |
| 4,701,909 A | 10/1987 | Kavehrad et al. |
| 4,704,733 A | 11/1987 | Kawano |
| 4,718,004 A | 1/1988 | Dalal |
| 4,726,644 A | 2/1988 | Mathis |
| 4,754,451 A | 6/1988 | Eng et al. |
| 4,759,051 A | 7/1988 | Han |
| 4,760,573 A | 7/1988 | Calvignac et al. |
| 4,790,000 A | 12/1988 | Kinoshita |
| 4,797,947 A | 1/1989 | Labedz |
| 4,813,054 A | 3/1989 | Plumb |
| 4,816,825 A | 3/1989 | Chan et al. |
| 4,831,662 A | 5/1989 | Kuhn |
| 4,849,963 A | 7/1989 | Kawano et al. |
| 4,916,460 A | 4/1990 | Powell |
| 4,920,533 A | 4/1990 | Dufresne et al. |
| 4,932,049 A | 6/1990 | Lee |
| 4,959,829 A | 9/1990 | Griesing |
| 4,977,593 A | 12/1990 | Ballance |
| 4,999,831 A | 3/1991 | Grace |
| 5,067,147 A | 11/1991 | Lee |
| 5,067,173 A | 11/1991 | Gordon et al. |
| 5,084,869 A | 1/1992 | Russell |
| 5,099,248 A | 3/1992 | Brommer |
| 5,101,501 A | 3/1992 | Gilhousen et al. |
| 5,136,410 A | 8/1992 | Heiling et al. |
| 5,138,440 A | 8/1992 | Radice |
| 5,159,479 A | 10/1992 | Takagi |
| 5,175,867 A | 12/1992 | Wejke et al. |
| 5,193,109 A | 3/1993 | Chien-Yeh Lee |
| 5,227,679 A | 7/1993 | Woo |
| 5,243,598 A | 9/1993 | Lee |
| 5,251,053 A | 10/1993 | Heidemann |
| 5,263,177 A | 11/1993 | Schieve et al. |
| 5,267,261 A | 11/1993 | Blakeney, II et al. |
| 5,272,700 A | 12/1993 | Hansen et al. |
| 5,278,690 A | 1/1994 | Vella-Coleiro |
| 5,280,472 A | 1/1994 | Gilhousen et al. |
| 5,285,469 A | 2/1994 | Vanderpool |
| 5,297,193 A | 3/1994 | Bouix et al. |
| 5,299,198 A | 3/1994 | Kay et al. |
| 5,301,056 A | 4/1994 | O'Neill |
| 5,303,287 A | 4/1994 | Laborde |
| 5,305,308 A | 4/1994 | English et al. |
| 5,309,474 A | 5/1994 | Gilhousen et al. |
| 5,313,461 A | 5/1994 | Ahl et al. |
| 5,317,323 A | 5/1994 | Kennedy et al. |
| 5,321,736 A | 6/1994 | Beasley |
| 5,321,849 A | 6/1994 | Lemson |
| 5,327,144 A | 7/1994 | Stilp et al. |
| 5,339,184 A | 8/1994 | Tang |
| 5,381,459 A | 1/1995 | Lappington |
| 5,392,453 A | 2/1995 | Gudmundson et al. |
| 5,400,391 A | 3/1995 | Emura et al. |
| 5,442,700 A | 8/1995 | Snell et al. |
| 5,457,557 A | 10/1995 | Zarem et al. |
| 5,461,627 A | 10/1995 | Rypinski |
| 5,508,708 A | 4/1996 | Ghosh et al. |
| 5,519,691 A | 5/1996 | Darcie et al. |
| 5,543,397 A | 8/1996 | Drauz et al. |
| 5,545,397 A | 8/1996 | Spielvogel et al. |
| 5,552,920 A | 9/1996 | Glynn |
| 5,563,606 A | 10/1996 | Wang |
| 5,566,168 A | 10/1996 | Dent |
| 5,586,121 A | 12/1996 | Moura et al. |
| 5,587,734 A | 12/1996 | Lauder et al. |
| 5,592,470 A | 1/1997 | Rudrapatna et al. |
| 5,602,903 A | 2/1997 | LeBlanc et al. |
| 5,603,080 A | 2/1997 | Kallander et al. |
| 5,621,786 A | 4/1997 | Fischer et al. |
| 5,627,879 A | 5/1997 | Russell et al. |
| 5,630,204 A | 5/1997 | Hylton et al. |
| 5,642,405 A | 6/1997 | Fischer et al. |
| 5,644,622 A | 7/1997 | Russell et al. |
| 5,657,374 A | 8/1997 | Russell et al. |
| 5,682,256 A | 10/1997 | Motley et al. |
| 5,708,961 A | 1/1998 | Hylton et al. |
| 5,724,385 A | 3/1998 | Levin et al. |
| 5,732,076 A | 3/1998 | Ketseoglou et al. |
| 5,761,619 A | 6/1998 | Danne et al. |
| 5,765,097 A | 6/1998 | Dail |
| 5,765,099 A | 6/1998 | Georges et al. |
| 5,774,085 A | 6/1998 | Yanagimoto et al. |
| 5,774,660 A | 6/1998 | Brendel et al. |
| 5,774,789 A | 6/1998 | Van der Kaay et al. |
| 5,781,541 A | 7/1998 | Schneider |
| 5,781,859 A | 7/1998 | Beasley |
| 5,781,865 A | 7/1998 | Gammon |
| 5,794,153 A | 8/1998 | Ariyavisitakul et al. |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,815,538 A | 9/1998 | Grell et al. |
| 5,822,324 A | 10/1998 | Kostresti et al. |
| 5,828,661 A | 10/1998 | Weaver, Jr. et al. |
| 5,848,063 A | 12/1998 | Weaver, Jr. et al. |
| 5,852,651 A | 12/1998 | Fischer et al. |
| 5,874,914 A | 2/1999 | Krasner |
| 5,878,325 A | 3/1999 | Dail |
| 5,907,544 A | 5/1999 | Rypinski |
| 5,946,622 A | 8/1999 | Bojeryd |
| 5,969,679 A | 10/1999 | Bollinger et al. |
| 5,969,837 A | 10/1999 | Farber et al. |
| 5,970,414 A | 10/1999 | Bi et al. |
| 5,987,014 A | 11/1999 | Magill et al. |
| 5,987,326 A | 11/1999 | Tiedemann, Jr. et al. |
| 6,005,884 A | 12/1999 | Cook et al. |
| 6,034,950 A | 3/2000 | Sauer et al. |
| 6,061,089 A | 5/2000 | Tonkin et al. |
| 6,078,571 A | 6/2000 | Hall |
| 6,097,712 A | 8/2000 | Secord et al. |
| 6,108,113 A | 8/2000 | Fee |
| 6,108,550 A | 8/2000 | Wiorek et al. |
| 6,108,626 A | 8/2000 | Cellario et al. |
| 6,112,086 A | 8/2000 | Wala |
| 6,122,529 A | 9/2000 | Sabat, Jr. et al. |
| 6,128,470 A | 10/2000 | Naidu et al. |
| 6,147,786 A | 11/2000 | Pan |
| 6,150,993 A | 11/2000 | Dobrovolny |
| 6,157,659 A | 12/2000 | Bird |
| 6,181,687 B1 | 1/2001 | Bisdikian |
| 6,188,693 B1 | 2/2001 | Murakami |
| 6,188,906 B1 | 2/2001 | Lim et al. |
| 6,192,216 B1 | 2/2001 | Sabat, Jr. et al. |

(56) References Cited

U.S. PATENT DOCUMENTS

| | | |
|---|---|---|
| 6,195,342 B1 | 2/2001 | Rohani |
| 6,198,558 B1 | 3/2001 | Graves et al. |
| 6,201,802 B1* | 3/2001 | Dean .......................... 370/328 |
| 6,216,004 B1 | 4/2001 | Tiedemann, Jr. et al. |
| 6,222,660 B1 | 4/2001 | Traa |
| 6,223,021 B1 | 4/2001 | Silvia et al. |
| 6,226,274 B1 | 5/2001 | Reese et al. |
| 6,236,365 B1 | 5/2001 | LeBlanc et al. |
| 6,259,910 B1 | 7/2001 | Fairfield et al. |
| 6,262,981 B1 | 7/2001 | Schmutz |
| 6,263,135 B1 | 7/2001 | Wade |
| 6,275,990 B1 | 8/2001 | Dapper et al. |
| 6,298,246 B1 | 10/2001 | Lysejko et al. |
| 6,308,085 B1 | 10/2001 | Shoki |
| 6,317,884 B1 | 11/2001 | Eames et al. |
| 6,336,042 B1 | 1/2002 | Dawson et al. |
| 6,337,754 B1 | 1/2002 | Imajo |
| 6,349,200 B1 | 2/2002 | Sabat, Jr. et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,452,917 B1* | 9/2002 | Leung .......................... 370/342 |
| 6,463,301 B1 | 10/2002 | Bevan et al. |
| 6,466,572 B1 | 10/2002 | Ethridge et al. |
| 6,480,551 B1 | 11/2002 | Ohishi et al. |
| 6,480,702 B1 | 11/2002 | Sabat, Jr. |
| 6,486,907 B1 | 11/2002 | Farber et al. |
| 6,498,936 B1 | 12/2002 | Raith |
| 6,501,955 B1 | 12/2002 | Durrant et al. |
| 6,504,831 B1 | 1/2003 | Greenwood et al. |
| 6,564,057 B1 | 5/2003 | Chun et al. |
| 6,567,473 B1 | 5/2003 | Tzannes |
| 6,580,905 B1 | 6/2003 | Naidu et al. |
| 6,643,498 B1 | 11/2003 | Miyajima |
| 6,667,973 B1 | 12/2003 | Gorshe et al. |
| 6,674,966 B1 | 1/2004 | Koonen |
| 6,697,603 B1 | 2/2004 | Lovinggood et al. |
| 6,704,545 B1 | 3/2004 | Wala |
| 6,729,929 B1 | 5/2004 | Sayers et al. |
| 6,738,581 B2 | 5/2004 | Handelman |
| 6,768,745 B1 | 7/2004 | Gorshe et al. |
| 6,771,933 B1 | 8/2004 | Eng et al. |
| 6,785,558 B1 | 8/2004 | Stratford et al. |
| 6,801,767 B1 | 10/2004 | Schwartz et al. |
| 6,807,374 B1 | 10/2004 | Imajo et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,963,552 B2 | 11/2005 | Sabat, Jr. et al. |
| 6,967,966 B1 | 11/2005 | Donohue |
| 6,980,831 B2 | 12/2005 | Matsuyoshi et al. |
| 7,016,308 B1 | 3/2006 | Gallagher |
| 7,031,335 B1 | 4/2006 | Donohue |
| 7,035,671 B2 | 4/2006 | Solum |
| 7,047,313 B1 | 5/2006 | Broerman |
| 7,103,279 B1 | 9/2006 | Koh et al. |
| 7,127,175 B2 | 10/2006 | Mani et al. |
| 7,162,261 B1 | 1/2007 | Yarkosky et al. |
| 7,205,864 B2 | 4/2007 | Schultz, Jr. et al. |
| 7,215,651 B2 | 5/2007 | Millar |
| 7,289,972 B2 | 10/2007 | Rieser et al. |
| 7,313,415 B2 | 12/2007 | Wake et al. |
| 2001/0031014 A1 | 10/2001 | Subramanian et al. |
| 2001/0036163 A1 | 11/2001 | Sabat, Jr. et al. |
| 2002/0003645 A1 | 1/2002 | Kim et al. |
| 2002/0048071 A1 | 4/2002 | Suzuki et al. |
| 2002/0072329 A1 | 6/2002 | Bandeira et al. |
| 2002/0167954 A1 | 11/2002 | Highsmith et al. |
| 2002/0183069 A1* | 12/2002 | Myr .......................... 455/456 |
| 2002/0191565 A1 | 12/2002 | Mani et al. |
| 2002/0193133 A1 | 12/2002 | Shibutani |
| 2003/0008663 A1 | 1/2003 | Stein et al. |
| 2003/0012257 A1* | 1/2003 | Challa et al. .................. 375/130 |
| 2003/0015943 A1 | 1/2003 | Kim et al. |
| 2003/0021334 A1* | 1/2003 | Levin et al. .................... 375/147 |
| 2003/0043928 A1 | 3/2003 | Ling et al. |
| 2003/0050041 A1 | 3/2003 | Wu |
| 2003/0072277 A1* | 4/2003 | Subrahmanya et al. ....... 370/320 |
| 2003/0133182 A1 | 7/2003 | Ng et al. |
| 2003/0143947 A1 | 7/2003 | Lyu |
| 2003/0161289 A1* | 8/2003 | Abrol et al. .................... 370/338 |
| 2003/0162516 A1 | 8/2003 | Solum |
| 2004/0009785 A1* | 1/2004 | Nelson et al. .................. 370/320 |
| 2004/0010609 A1 | 1/2004 | Vilander et al. |
| 2004/0033804 A1 | 2/2004 | Binzel |
| 2004/0037565 A1 | 2/2004 | Young et al. |
| 2004/0116083 A1* | 6/2004 | Suzuki et al. .................. 455/126 |
| 2004/0198453 A1 | 10/2004 | Cutrer et al. |
| 2004/0203339 A1 | 10/2004 | Bauman |
| 2004/0219950 A1 | 11/2004 | Pallonen et al. |
| 2004/0233899 A1* | 11/2004 | Vayanos et al. ............... 370/328 |
| 2004/0252044 A1 | 12/2004 | Mathis et al. |
| 2004/0258100 A1 | 12/2004 | Jantti et al. |
| 2005/0007993 A1 | 1/2005 | Chambers et al. |
| 2005/0147067 A1 | 7/2005 | Mani et al. |
| 2005/0201323 A1 | 9/2005 | Mani et al. |
| 2005/0243785 A1 | 11/2005 | Sabat, Jr. et al. |
| 2005/0250503 A1 | 11/2005 | Cutrer |
| 2005/0265274 A1* | 12/2005 | Cleveland ...................... 370/320 |
| 2006/0025136 A1* | 2/2006 | Fujita et al. .................... 455/436 |
| 2006/0121944 A1 | 6/2006 | Buscaglia et al. |
| 2006/0193295 A1 | 8/2006 | White et al. |
| 2008/0150514 A1 | 6/2008 | Codreanu et al. |
| 2008/0285526 A1* | 11/2008 | Gorokhov et al. ............. 370/338 |
| 2009/0247094 A1* | 10/2009 | Sakoda .......................... 455/78 |
| 2009/0279497 A1* | 11/2009 | Nogami et al. ................ 370/329 |
| 2011/0228710 A1* | 9/2011 | Mesecher et al. ............. 370/328 |

FOREIGN PATENT DOCUMENTS

| | | |
|---|---|---|
| EP | 0166885 | 1/1986 |
| EP | 0346925 | 12/1989 |
| EP | 0368673 | 5/1990 |
| EP | 0391597 | 10/1990 |
| EP | 0468688 | 1/1992 |
| EP | 0664621 | 7/1995 |
| EP | 0876073 | 11/1998 |
| FR | 2345865 | 10/1977 |
| GB | 2253770 | 9/1992 |
| GB | 2289198 | 11/1995 |
| GB | 2315959 | 2/1998 |
| GB | 2320653 | 6/1998 |
| JP | 58164007 | 9/1983 |
| JP | 3026031 | 2/1991 |
| JP | 5012374 | 1/1993 |
| JP | 2006186997 | 7/2006 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 0217669 | 2/2002 |
| WO | 02059638 | 8/2002 |
| WO | 02087275 | 10/2002 |
| WO | 2006000424 | 1/2006 |
| WO | 2008063489 | 5/2008 |

OTHER PUBLICATIONS

Merrett et al., "A Cordless Access System Using Radio-Over-Fibre Techniques", "41st IEEE Vehicular Technology Conference Gateway to the Future Technology in Motion", May 19, 1991, pp. 921-924, Published in: St.Louis, MO.

Lee et al., "Intelligent Microcell Applications in PCS", "43rd IEEE Vehicular Technology Conference, Personal Communication—Free- (56) References Cited

OTHER PUBLICATIONS dom Through Wireless Technology ", May 18, 1993, pp. 722-725, Publisher: Pactel Corporation, Published in: Secaucus, NJ.
ADC Kentrox Wirelss Systems Group, ""CityCell 824, A Positioning White Paper"", Mar. 1, 1993, Publisher: CITA Trade Show, Published in: US.
Telocator Bulletin, ""ADC Kentrox Introduces CityCell 824, A Replacement for Conventional Cell Sites"", Feb. 1, 1993, Published in: US.
Lewis, "ADC-Kentrox Call Report With Bell Atlantic", Oct. 18, 1992.
ADC Kentrox, "ADC Kentrox Introduces Innovative Wireless Network Access Solution Cellular Subscribers Offered a New Level of Portable", Mar. 1, 1993, pp. 1-3, Publisher: ADC Kentrox, Published in: Portland, OR.
Akos et al., "Direct Bandpass Sampling of Multiple Distinct RF Signals", Jul. 1, 1999, pp. 983-988, vol. 47, Publisher: IEEE Transactions on Communications.
"And Now a Few Words From Your Customers", "And Now a Few Words From Your Customers", Aug. 1992, pp. 1-4, Publisher: ADC Kentrox, Published in: Portland,OR.
Foxcom Wireless Proprietary Information, "Application Note RFiber—RF Fiberoptic Links for Wireless Applications", 1998, pp. 3-11.
Cox, "A Radio System Proposal for Widespread Low-Power Tetherless Communications", "IEEE Transactions on Communications", Feb. 1991, pp. 324-335, vol. 39, No. 2, Publisher: IEEE.
Ishio et al. , "A Two-Way Wavelength-Division-Multiplexing Transmission and Its Application to a Switched TV-Distribution System", Dec. 22, 2000, Publisher: Ekectrical Communication Laboratories, Nipon Telegraph and Telepone Corporation , Published in: Yokosuka, Japan.
Ameritech, "Broadband Optical Transport Digital Microcell Connection Service-Interface and Performance Specifications A Technical D", "Cellular Industry", Dec. 1993, pp. 1-26, Publisher: The Day Group.
City Cell, Cellular Industry the Day Group, "ADC Kentrox CityCell Field Trial Yields Another First-Simultaneous Analog and Digital Calls", prior to Dec. 22, 2000.
Djuknic, G.M. and R.E. Richton, "Geolocation and Assisted GPS", "IEEE Computer", Feb. 2001, pp. 123-125, vol. 34, No. 2, Publisher: IEEE.
Stern, "Passive Optical Local Networks for Telephony Applications and Beyond", "Electronics Letters an International Publication", Nov. 19, 1987, pp. 1255-1257, vol. 23, No. 24, Publisher: IEEE.
Tang, "Fiber Optic Antenna Remoting for Multi-Sector Cellular Cell Sites", "GTE Laboratories—Abstract", Jun. 14-18, 1992.
ADC Kentrox, "First Field Trial Results Exceed Expectations ADC Kentrox and Cellular One Join Force to Provide a New Level of Portable", Mar. 2, 1993, pp. 1-2, Publisher: ADC Kentrox, Published in: Portland, OR.
Payne et al., "Single Mode Optical Local Networks", "Globecom '85 IEEE Global Telecommunications Conference", Dec. 2-5, 1985, pp. 1201-1206, vol. 3 of 3, Publisher: IEEE, Published in: New Orleans,LA.
Steele, "Towards a High-Capacity Digital Cellular Mobile Radio System", Aug. 1995, Published in: US.
Titch, "Kentrox Boosts Coverage and Capacity", "Telephony", Jan. 25, 1993.
Gupta et al., "Land Mobile Radio Systems—A Tutorial Exposition", "IEEE Communications Magazine", Jun. 1985, pp. 34-45, vol. 23, No. 6, Publisher: IEEE.

Foxcom Wireless Properietary Information, "Litenna In-Building RF Distribution System", 1998, pp. 1-8, Publisher: Foxcom Wireless.
Schneiderman, "Offshore Markets Gain in Size, Competitiveness Even the Smallest Industry Companies are Expanding Their Global Buisness", "Microwaves and RF", Mar. 1993, pp. 33-39, vol. 32, No. 3, Publisher: Penton Publishing, Inc, Published in: Berea, OH.
Microwaves & RF , "Digital Transport for Cellular", Feb. 1993.
Nakatsugawa et al., "Software Radio Base and Personal Stations for Cellular/PCS Systems", 2000, pp. 617-621, Publisher: IEEE.
Russell, "New Microcell Technology Sets Cellular Carriers Free", "Telephony", Mar. 1993, pp. 40, 42, and 46.
Cellular Industry, The Day Group, "New Signal Transport Technology Digitizes the Cellular Band", Dec. 22, 2000.
Kobb, "Personal Wireless", "IEEE Spectrum", Jun. 1993, pp. 20-25, Publisher: IEEE.
O'Byrne, "TDMA and CDMA in a Fiber-Optic Environment", Oct. 5, 1992, pp. 727-731, Publisher: IEEE.
"Tektronix Synchronous Optical Network (SONET)", "http://www.iec.org/online/tutorials/sonet/topic03.html", Aug. 28, 2002, Publisher: International Engineering Consortium.
Quinn, "The Cell Enhancer", 1982, pp. 77-83, Publisher: Bell Atlanttic Mobile Systems.
"Urban Microcell System Layout—Presentation", Jun. 14-18, 1992, Publisher: GTE Laboritories.
Zonemaster, "Maximum Coverage for High-Capacity Locations", "1993 Decibel Products", 1993, pp. 1-4, Publisher: Decibel Multi Media Microcell System.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", Jun. 1991, pp. 1171-1175, Publisher: IEEE.
International Searching Authority, "International Search Report", Aug. 25, 2010, Published in: WO.
European Patent Office, "Extended European Search Report", "from Foreign Counterpart of U.S. Appl. No. 12/468,122", Nov. 28, 2013, pp. 1-4, Published in: EP.
Japanese Patent Office, "English Translation of Office Action from JP Application No. 2012-511947 mailed Feb. 26, 2014", "from Foreign Counterpart of U.S. Appl. No. 12/468,122", Feb. 26, 2014, pp. 1-2, Published in: JP.
Abe et al., "A Practical Throughput Comparison of MIMO-CDMA and MIMO-OFDM", "Vehicular Technology Conference", Sep. 26, 2004, pp. 1431-1438, vol. 2.
Hong et al., "Robust Frequency Offset Estimation for Pilot Symbol Assisted Packet CDMA With MIMO Antenna Systems", "IEEE Communications Letters", Jun. 2002, pp. 262-264, vol. 6, No. 6, Publisher: IEEE.
Japanese Patent Office, "Notice of Allowance from JP Application No. 2012-511947 mailed Jun. 2, 2014", "from Foreign Counterpart of U.S. Appl. No. 12/468,122", Jun. 2, 2014, pp. 1-4, Published in: JP.
Australian Patent Office, "Office Action from AU Application No. 2010249770 mailed Mar. 7, 2014", "from Foreign Counterpart of U.S. Appl. No. 12/468,122", Mar. 7, 2014, pp. 1-3, Published in: AU.
State Intellectual Property Office, P.R. China, "First Office Action from CN Application No. 201080032587.4 mailed Dec. 30, 2013", "from Foreign Counterpart of U.S. Appl. No. 12/468,122 ", Dec. 30, 2013, pp. 1-30, Published in: CN.
Chinese Patent Office, "Second Office Action for CN Application No. 201080032587.4", "from Foreign Counterpart U.S. Appl. No. 12/468,122", Sep. 9, 2014, pp. 1-9, Published in: CN.

* cited by examiner

METHOD OF INSERTING CDMA BEACON PILOTS IN OUTPUT OF DISTRIBUTED REMOTE ANTENNA NODES

BACKGROUND

One way that a wireless cellular service provider can improve the coverage provided by a given base station or group of base stations is by using a distributed antenna system (DAS). In a DAS, radio frequency (RF) signals are communicated between a host unit and one or more remote antenna nodes. A host unit is communicatively coupled to one or more base stations. For example, the host unit is directly connected to the base station using coaxial cabling or the host unit communicates with the base station wirelessly (that is, "over the air" or "on frequency") using a donor antenna and a bi-directional amplifier (BDA). Down-link RF signals are received from the base station at the host unit. The host unit uses the down-link RF signals to generate a down-link transport signal for distributing to one or more of the remote antenna nodes. Each such remote antenna node receives the down-link transport signal and reconstructs the down-link RF signals from the down-link transport signal and causes the reconstructed down-link RF signals to be radiated from at least one antenna coupled to or included in that remote antenna node. A similar process is performed in the up-link direction. Up-link RF signals received at one or more remote antenna nodes are used to generate respective up-link transport signals that are transmitted from the respective remote antenna nodes to the host unit. The host unit receives and combines the up-link transport signals transmitted from the remote antenna nodes. The host unit reconstructs the up-link RF signals received at the remote antenna nodes and communicates the reconstructed up-link RF signals to the base station. In this way, the coverage of the base station can be expanded using the DAS. One or more intermediate devices (also referred to as "expansion hubs" or "expansion units") can be placed between the host unit and the remote antenna nodes in order to increase the number of remote antenna nodes that a single host unit can feed and/or to increase the host-unit-to-remote-antenna-node distance.

In one type of DAS, multiple remote nodes are simulcast from a single base station sector. The DAS is deployed in a 1×N configuration, i.e., one host interface feeds N remote antenna nodes. When the air interface being deployed is some form of code division multiple access (CDMA), there is sometimes a need to broadcast CDMA pilot signals, known as "beacon" pilots, in addition to the pilots associated with the main traffic bearing channels. These beacon pilots can be used to assist in handoff of communication devices (such as handsets) from one base station sector to another, or to assist in mobile position determination.

SUMMARY

The present application relates to a communication system to feed remote antenna nodes with simulcast traffic and non-simulcast beacons. The communication system includes a host radio frequency (RF) digitizer, a delay buffer, a summing circuit, and a framer/serializer. The host RF digitizer receives code division multiple access (CDMA) base station signals for simulcast CDMA-traffic-bearing channels and outputs digital samples. The delay buffer is communicatively coupled to receive the samples output from a beacon pilot generator and to output digitally delayed CDMA-digital-beacon-pilot samples having different pseudo-noise offsets. The summing circuit adds the CDMA-digital-beacon-pilot samples having different pseudo-noise offsets to the digital samples received from the host RF digitizer to form composite simulcast-plus-uniquely-offset-beacon-pilot CDMA samples. The framer/serializer is communicatively coupled to receive the composite simulcast-plus-uniquely-offset-beacon-pilot CDMA samples and to route the composite simulcast-plus-uniquely-offset-beacon-pilot CDMA samples to an associated remote antenna node.

The present application also relates to a distributed antenna system to feed remote antenna nodes with simulcast code division multiple access (CDMA) traffic and non-simulcast beacon pilots. The distributed antenna system includes a first digital up-converter to receive CDMA digital base station signals from a digital base station and to output digital samples for CDMA-traffic-bearing channels, and a second digital up-converter to receive digital baseband samples from a baseband beacon pilot generator and to output digital intermediate frequency (IF) samples. The distributed antenna system also includes a delay buffer communicatively coupled to receive the digital IF samples from the digital up-converter and configured to output CDMA-digital-beacon-pilot samples having different timing offsets, and a summing circuit to form composite simulcast-plus-uniquely-offset-beacon-pilot CDMA samples by summing the digital samples for CDMA-traffic-bearing channels with the CDMA-digital-beacon-pilot samples having different timing offsets.

The present application also relates to a method to distribute simulcast code division multiple access (CDMA)-traffic-bearing channels together with non-simulcast CDMA-digital-beacon-pilot samples having different timing-offsets using a single beacon pilot generator. The method includes receiving CDMA radio frequency signals from a base station at a host radio frequency digitizer, converting CDMA base station signals into digital samples for traffic bearing channels at the host RF digitizer, receiving CDMA-digital-beacon-pilot samples at a delay buffer, simultaneously tapping CDMA-digital-beacon-pilot samples having different timing offsets from the delay buffer, adding the CDMA-digital-beacon-pilot samples having different timing offsets to the CDMA base station digital samples to form composite simulcast-plus-uniquely-offset-beacon-pilot CDMA samples, and receiving the composite simulcast-plus-uniquely-offset-beacon-pilot CDMA sample streams at a framer/serializer.

The present application also relates to a host unit to feed remote antenna nodes with simulcast traffic and non-simulcast beacons. The host unit includes a host radio frequency (RF) digitizer to receive code division multiple access (CDMA) base station signals for simulcast CDMA-traffic-bearing channels and to output digital samples, a summing circuit to add CDMA-digital-beacon-pilot samples having different timing offsets to the digital samples received from the host RF digitizer to form composite simulcast-plus-uniquely-offset-beacon-pilot CDMA samples, and a framer/serializer configured to output each composite simulcast-plus-uniquely-offset-beacon-pilot CDMA sample to an associated remote antenna node.

The details of various embodiments of the claimed invention are set forth in the accompanying drawings and the description below.

DRAWINGS

Like reference numbers and designations in the various drawings indicate like elements.

DETAILED DESCRIPTION

In the DAS, it may be desirable for the broadcasted beacon pilots described above to be different for each remote antenna node or for neighboring remote antenna nodes, even though the traffic channels are simulcast. For example, a strong unique beacon pilot at or near the entrance to a building ensures that handsets of those entering the building are handed to the remote antenna node at the entrance of the building. This ensures a smooth handoff to the remote antenna nodes inside the building as the handset is moved further into the building.

The systems described herein are embodiments of communication systems, such as DASs, in which a single CDMA base station and a single beacon pilot generator feed multiple antennas with simulcast traffic and non-simulcast beacons in a simulcast 1×N configuration (i.e., one (1) host interface and N remote antenna nodes).

In the systems described herein, the non-simulcast beacons are uniquely-offset beacon pilots. Each uniquely-offset beacon pilot is recognized by an associated one of a plurality of remote antenna nodes. The combined uniquely-offset beacon pilot and digitized samples for the simulcast CDMA-traffic-bearing channels are referred to herein as "composite simulcast-plus-uniquely-offset-beacon-pilot CDMA samples." A stream of the composite simulcast-plus-uniquely-offset-beacon-pilot CDMA samples being output to a remote node is referred to herein as a "composite simulcast-plus-uniquely-offset-beacon-pilot CDMA sample stream."

Figure 1:
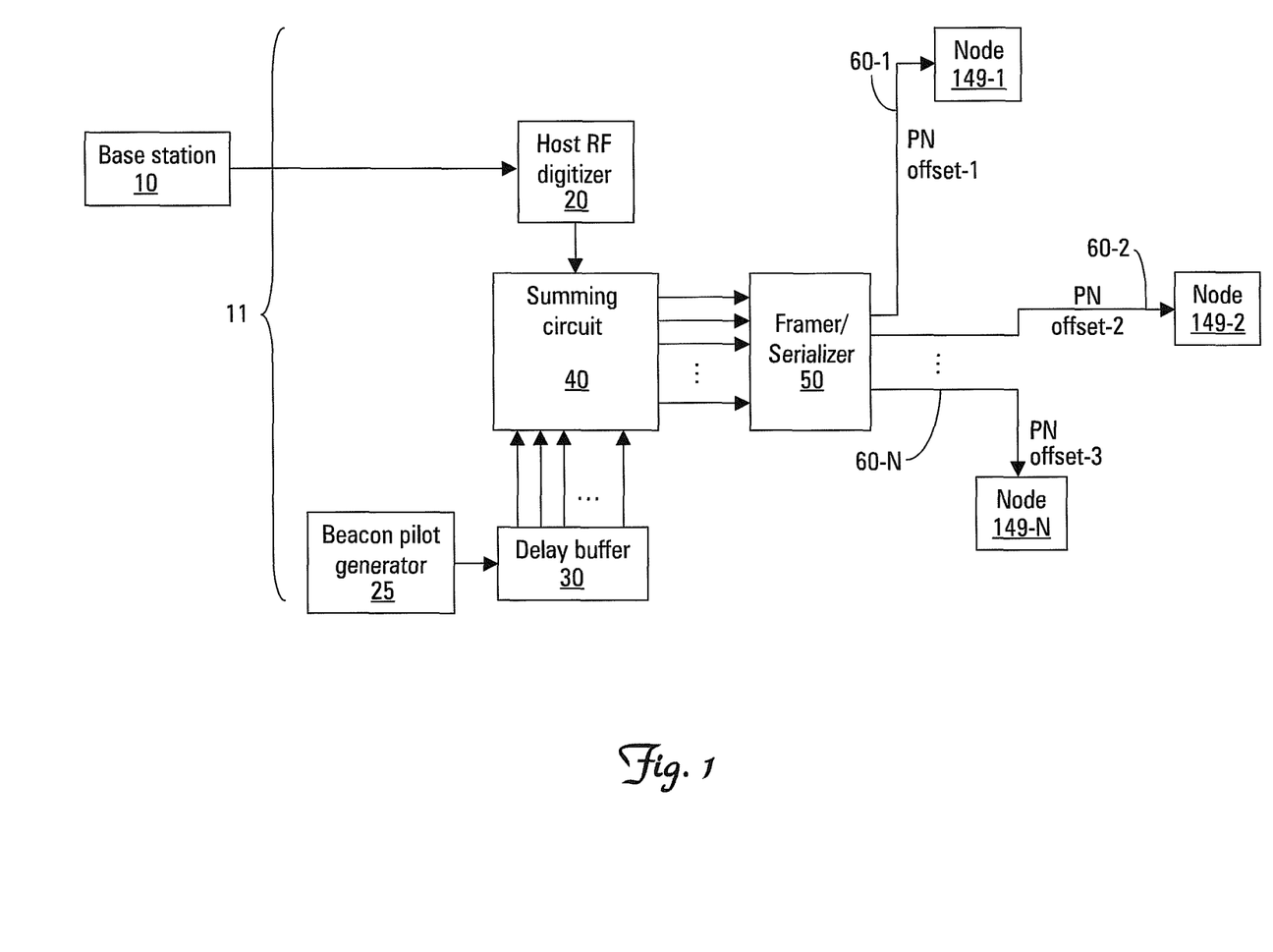
FIG. 1 is a block diagram of an embodiment of a communication system to feed remote antenna nodes with simulcast traffic and non-simulcast beacons in accordance with the present invention.

FIG. 1 is a block diagram of an embodiment of a communication system 11 to feed remote antenna nodes 49(1-N) with simulcast traffic and non-simulcast beacons in accordance with the present invention. FIGS. 2-6 are block diagrams of embodiments of distributed antenna systems 12-16, to feed remote antenna nodes 49(1-N) in accordance with the present invention. The systems 11-16 described herein add a uniquely-offset beacon pilot to simulcast CDMA-traffic-bearing channels sent to the plurality of remote antenna nodes 49(1-N). The systems 11-16 each allow different beacon pilots to be deployed in a simulcast 1×N configuration so each remote antenna node receives a unique beacon pilot with the simulcast samples without requiring the addition equipment needed in an N×N configuration. The systems 11-16 use a single beacon pilot generator in configurations that require only one or two host interface (e.g., RF digitizer) cards.

Figure 5:
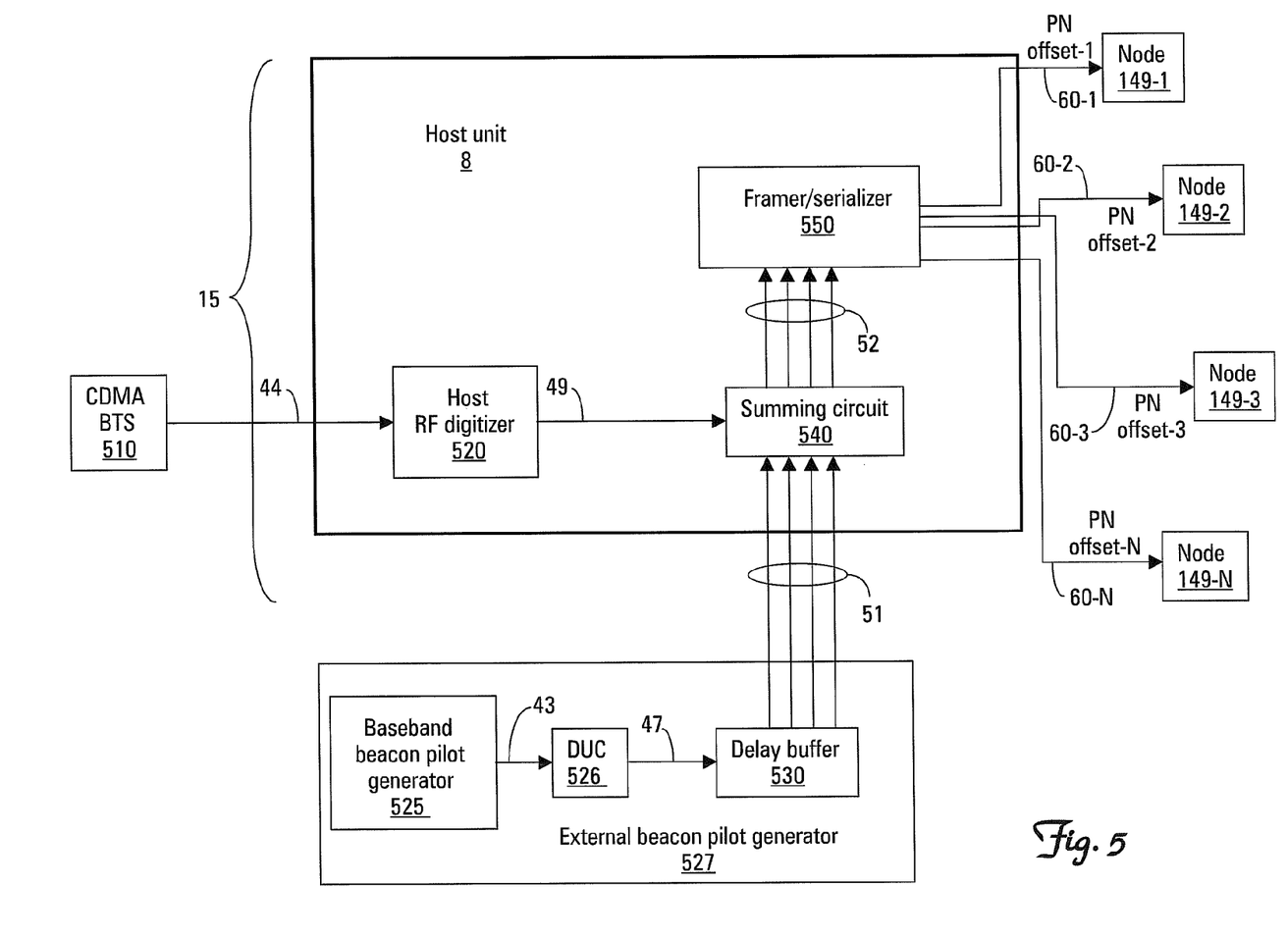
Figure 6:
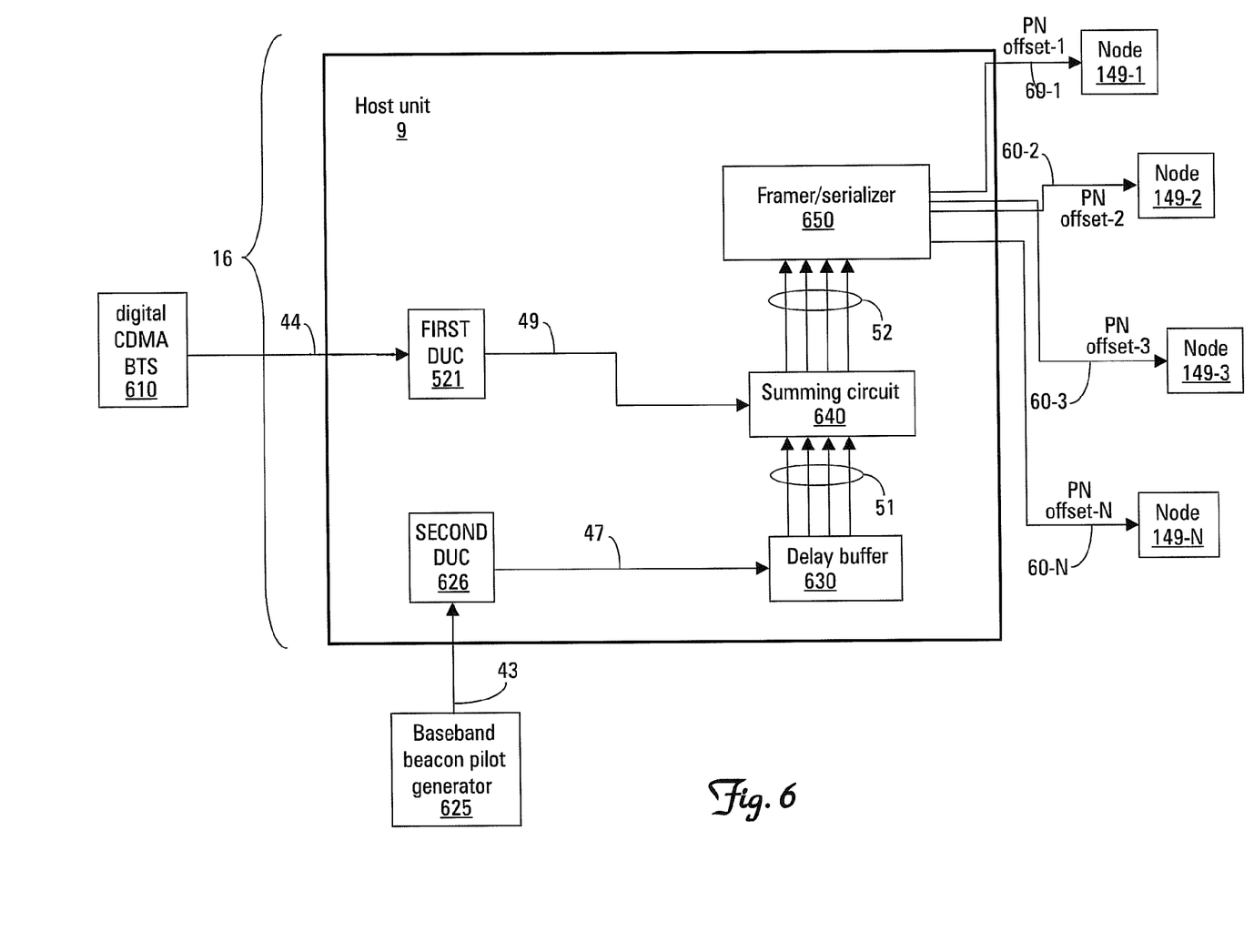

The DASs 12-16 described herein include configurations in which: 1) the beacon generator is external to a host unit and feeds radio frequency signals to an RF digitizer in the host unit (FIG. 2); 2) the beacon generator and the delay buffer are both internal to the host unit (FIGS. 3 and 4); 3) the delay buffer and digital up-converter are included in the beacon generator that is external to the host unit and feeds CDMA-digital-beacon-pilot samples with different timing offsets to the summing circuit in the host unit (FIG. 5); and 4) the beacon generator is external to the host unit and generates digital baseband samples that are interfaced to a digital up-converter card in the host unit that plugs into a RF digitizer slot (FIG. 6). Additionally, the systems described herein include two options for the interface between the CDMA base station and the host unit: 1) an RF interface to a host RF digitizer in the host unit (FIGS. 1-5); and 2) a digital interface to a digital up-converter (DUC) card in an RF digitizer slot in the host unit (FIG. 6).

FIG. 1 is an embodiment of a communication system 11 to feed simulcast traffic and non-simulcast beacons in samples sent to remote antenna nodes 149(1-N) in accordance with the present invention. The communication system 11 (also referred to herein as a DAS 11) is communicatively coupled to a base station 10. The DAS 11 includes a host radio frequency (RF) digitizer 20, a beacon pilot generator 25, a delay buffer 30, a summing circuit 40, a framer/serializer 50, and the remote antenna nodes 149(1-N). The framer/serializer 50 is communicatively coupled to the remote antenna nodes 149(1-N) via respective optical fibers 60(1-N).

The base station 10 sends simulcast CDMA-traffic-bearing RF channels to the host RF digitizer 20. The host RF digitizer 20 outputs digital samples to the summing circuit 40. The beacon pilot generator 25 outputs samples (at intermediate frequency) to the delay buffer 30. The delay buffer 30 outputs digitally delayed CDMA-digital-beacon-pilot samples having different pseudo-noise offsets (e.g., PN offset-1, PN offset-2, and PN offset-N) to the summing circuit 40. The summing circuit 40 adds the CDMA-digital-beacon-pilot samples having different pseudo-noise offsets to the digital samples received from the host RF digitizer 20 to form composite simulcast-plus-uniquely-offset-beacon-pilot CDMA samples.

The composite simulcast-plus-uniquely-offset-beacon-pilot CDMA samples are output from the summing circuit 40 to the framer/serializer 50. The framer/serializer 50 routes each of the composite simulcast-plus-uniquely-offset-beacon-pilot CDMA sample streams to an $i^{th}$ associated remote antenna node 149-i. For example, the samples with PN offset-1 are output to the associated first remote antenna node 149-1. Likewise, the samples with PN offset-N are output to the associated $n^{th}$ remote antenna node 149-N. The terms remote antenna nodes, remote nodes, and nodes are interchangeably used herein. The host RF digitizer 20 is also referred to herein as a digital-analog radio transceiver (DART) 20. In one implementation of this embodiment, the communications includes the base station 10, however, the base station 10 is not part of the distributed antenna system.

Figure 2:
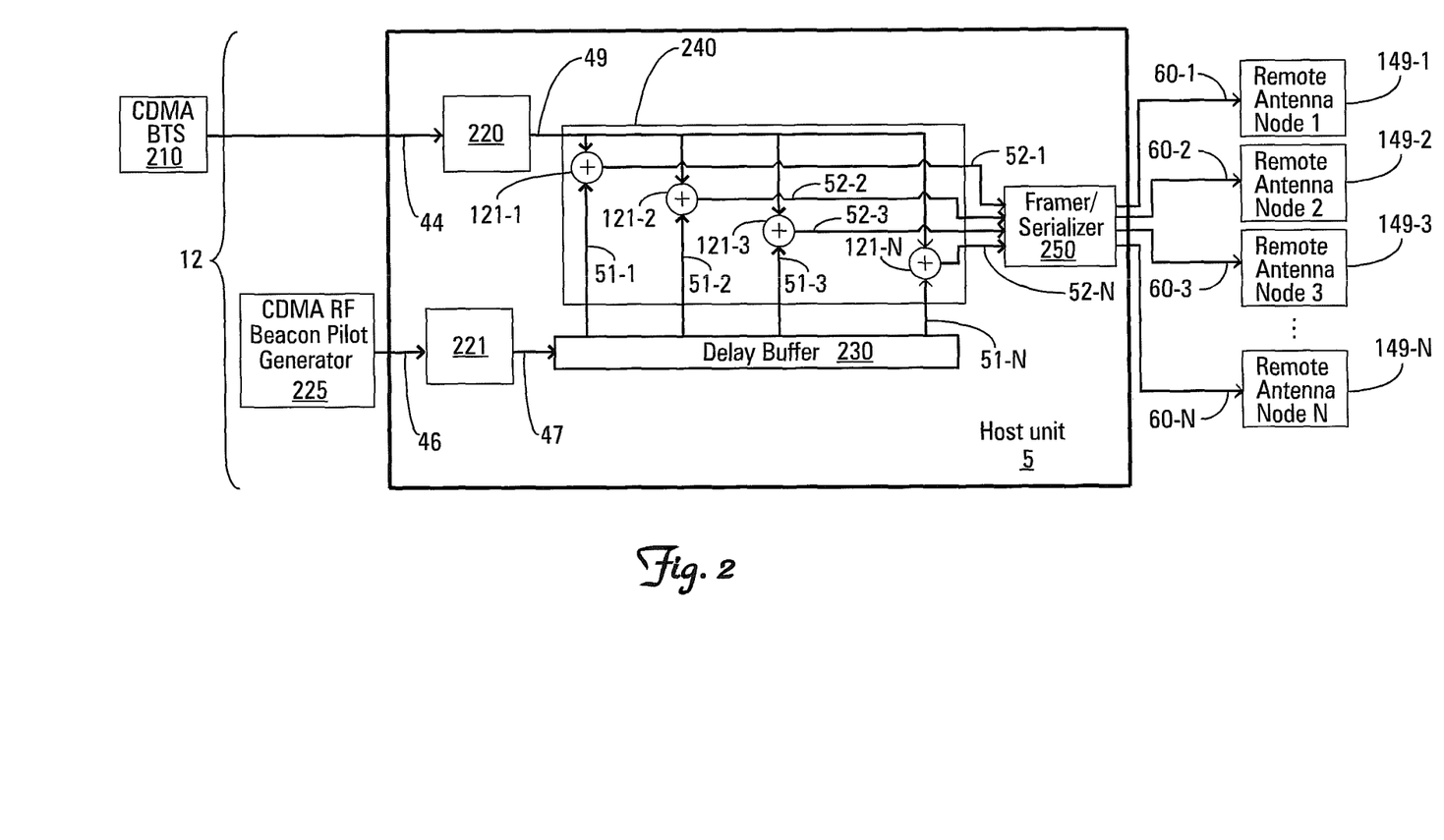
FIGS. 2-6 are block diagrams of embodiments of distributed antenna systems to feed remote antenna nodes with simulcast traffic and non-simulcast beacons in accordance with the present invention.

FIG. 2 is an embodiment of a DAS 12 to feed remote antenna nodes 149(1-N) with simulcast traffic and non-simulcast beacons in accordance with the present invention. The DAS 12 includes a host unit 5, a beacon pilot generator 225, and the remote antenna nodes 149(1-N) communicatively coupled to the host unit 5 via respective optical fibers 60(1-N). The DAS 12 is communicatively coupled to a CDMA base station 210. The host unit 5 includes a first host RF digitizer 220, a second host RF digitizer 221, a delay buffer 230, a summing circuit 240, and a framer/serializer 250. The summing circuit 240 includes a first summing circuit 121-1, a second summing circuit 121-2, up through an $n^{th}$ summing circuit 121-N. The beacon pilot generator 225 is a CDMA RF beacon pilot generator 225. The delay buffer 230 is also referred to herein as a tapped delay buffer 230.

The first host RF digitizer 220 receives CDMA RF base station signals for simulcast CDMA-traffic-bearing channels from the base station 210 via communication link 44. The CDMA-traffic-bearing channels include all associated traffic, sync, and paging channels.

The first host RF digitizer 220 converts the RF signals to digital samples for CDMA-traffic-bearing channels. The digital samples for CDMA-traffic-bearing channels are output from the first host RF digitizer 220. The summing circuit 240 is communicatively coupled to receive the digital samples that are output from the host RF digitizer 220 via link or trace line 49.

The beacon pilot generator 225 is communicatively coupled to output a RF CDMA beacon pilot to the second host RF digitizer 221 via communication link 46. The second host RF digitizer 221 outputs CDMA-digital-beacon-pilot samples to the delay buffer 230 via link or trace line 47. In one implementation of this embodiment, communication link 44 and/or communication link 46 are coax cables.

At the delay buffer 230, the CDMA-digital-beacon-pilot samples are digitally delayed to synthesize samples of pilot signals having different PN offset (1-N). The delay buffer 230 taps the CDMA-digital-beacon-pilot samples having different timing (pseudo-noise) offsets onto different links or trace lines 51(1-N). Delay taps in the delay buffer 130 are chosen to: 1) achieve the desired pseudo-noise offset at the remote antenna location; 2) compensate for any fiber delay; and/or 3) compensate for any additional delay compensation elsewhere in the DAS 12.

The summing circuit 240 adds the CDMA-digital-beacon-pilot samples having different PN offset (1-N) to the digital samples received from the first host RF digitizer 220 to form the composite simulcast-plus-uniquely-offset-beacon-pilot CDMA samples. The framer/serializer 250 routes each composite simulcast-plus-uniquely-offset-beacon-pilot CDMA sample stream to the associated one of the remote antenna nodes 149(1-N) communicatively coupled to the framer/serializer 250.

The manner in which the summing circuit 240 adds the CDMA-digital-beacon-pilot samples having different PN offset (1-N) to the digital samples from the first host RF digitizer 220 is now described. The delay buffer 230 taps a first CDMA-digital-beacon-pilot sample and taps a second CDMA-digital-beacon-pilot sample. The first CDMA-digital-beacon-pilot sample is sent via link 51-1 to the first summing circuit 121-1. The second CDMA-digital-beacon-pilot sample is sent via link 51-2 to the second summing circuit 121-2.

The first CDMA-digital-beacon-pilot sample is added to the simulcast digital sample from the first host RF digitizer 20 to generate a first-composite simulcast-plus-uniquely-offset-beacon-pilot CDMA sample at the first summing circuit 121-1. The second CDMA-digital-beacon-pilot sample is added to the same simulcast digital sample from the first host RF digitizer 20 to generate a second-composite simulcast-plus-uniquely-offset-beacon-pilot CDMA sample at the second summing circuit 121-2.

The first-composite simulcast-plus-uniquely-offset-beacon-pilot CDMA sample is sent to the framer/serializer 120 via link 52-1. The second-composite simulcast-plus-uniquely-offset-beacon-pilot CDMA sample is sent to the framer/serializer 120 via link 52-1. This process is carried out for each of N delay values, where N is an integer greater than 1, adding each of N CDMA-digital-beacon-pilot samples to the same simulcast digital sample from the first host RF digitizer 20 to generate N composite simulcast-plus-uniquely-offset-beacon-pilot CDMA samples at the output of the N summing circuits 121-1 through 121-N. All N composite simulcast-plus-uniquely-offset-beacon-pilot CDMA samples are simultaneously sent to the framer/serializer 120 via links 52-1 through 52-N.

The framer/serializer 250 outputs each composite simulcast-plus-uniquely-offset-beacon-pilot CDMA sample having an $i^{th}$ timing offset to an associated $i^{th}$ remote antenna node 149-$i$ via a respective $i^{th}$ communication links 60-$i$. Specifically, the framer/serializer 250 routes sample streams of composite simulcast-plus-uniquely-offset-beacon-pilot CDMA sample having an $i^{th}$ timing offset to an associated $i^{th}$ remote antenna node 149-$i$ via a respective $i^{th}$ communication links 60-$i$. In this manner, each one of the remote antenna nodes 149(1-N) receives a composite simulcast-plus-uniquely-offset-beacon-pilot CDMA sample stream.

The communication links 60(1-N) are optical fibers, coax cables, wireless links, or combinations thereof.

Figure 3:
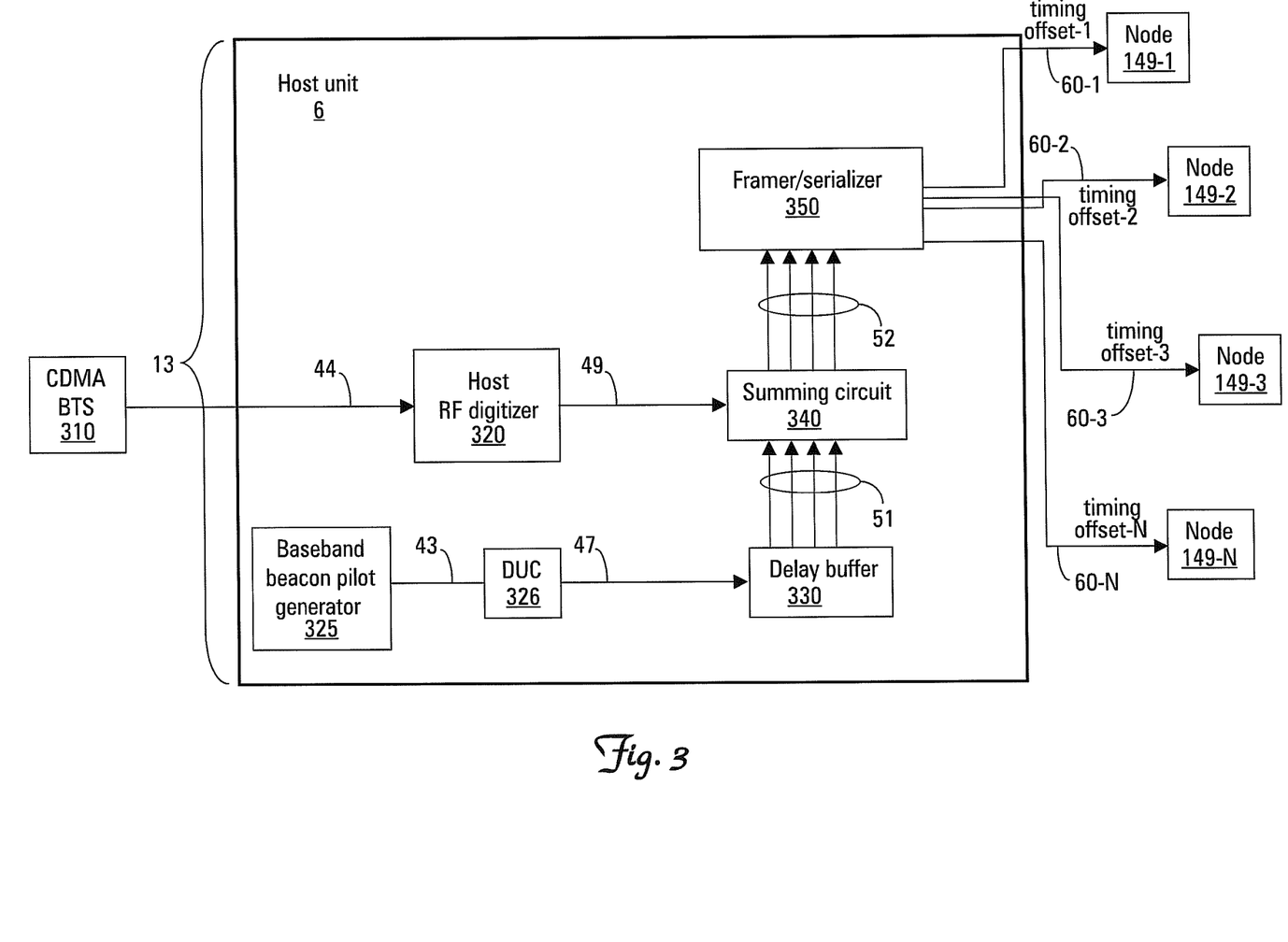

FIG. 3 is an embodiment of a DAS 13 to feed remote antenna nodes 149(1-N) with simulcast traffic and non-simulcast beacons in accordance with the present invention. In this embodiment, the beacon pilot generator is a baseband beacon pilot generator 325. The DAS 13 is communicatively coupled to a CDMA base station 310. The DAS 13 includes a host unit 6 and the remote antenna nodes 149(1-N) communicatively coupled to the host unit 6 via respective optical fibers 60(1-N).

The host unit 6 includes a host RF digitizer 320, the baseband beacon pilot generator 325, a digital up-converter (DUC), a delay buffer 330, a summing circuit 340, and a framer/serializer 350. In one implementation of this embodiment, the baseband beacon pilot generator 325 and the digital up-converter 326 are external to the host unit 6. In another implementation of this embodiment, the baseband beacon pilot generator 325 is a digital signal processor 325 configured to synthesize a digital beacon pilot.

The host RF digitizer 320 receives CDMA RF base station signals for simulcast CDMA-traffic-bearing channels from the CDMA base station 310 via communication link 44. The host RF digitizer 320 converts the RF signals to digital samples for CDMA-traffic-bearing channels. The digital samples for CDMA-traffic-bearing channels are output from the host RF digitizer 320. The summing circuit 340 is communicatively coupled to receive the digital samples that are output from the host RF digitizer 320 via link or trace line 49.

The digital up-converter 326 receives digital baseband samples from the baseband beacon pilot generator 325 via link 43. The digital up-converter 326 outputs CDMA-digital intermediate frequency (IF) samples to a delay buffer 330 via link or trace line 47. At the delay buffer 330, the CDMA-digital IF samples (also referred to herein as "CDMA-digital-beacon-pilot samples") are digitally delayed to synthesize samples of pilot signals having different timing offsets (1-N) (e.g., PN offsets). The delay buffer 330 sends CDMA-digital-beacon-pilot samples having different timing offsets to the summing circuit 340 via different links or trace lines represented generally at 51.

The summing circuit 340 adds the CDMA-digital-beacon-pilot samples having different timing offsets (1-N) to the digital samples for CDMA traffic bearing signals received from the host RF digitizer 320 to form the composite simulcast-plus-uniquely-offset-beacon-pilot CDMA samples. The composite simulcast-plus-uniquely-offset-beacon-pilot CDMA samples are sent to the framer/serializer 350 via the links or trace lines represented generally at 52. The framer/serializer 350 routes each of the composite simulcast-plus-uniquely-offset-beacon-pilot CDMA sample streams to an associated one of the remote antenna nodes 149(1-N) communicatively coupled to the framer serializer 350 as described above with reference to FIG. 2.

Figure 4:
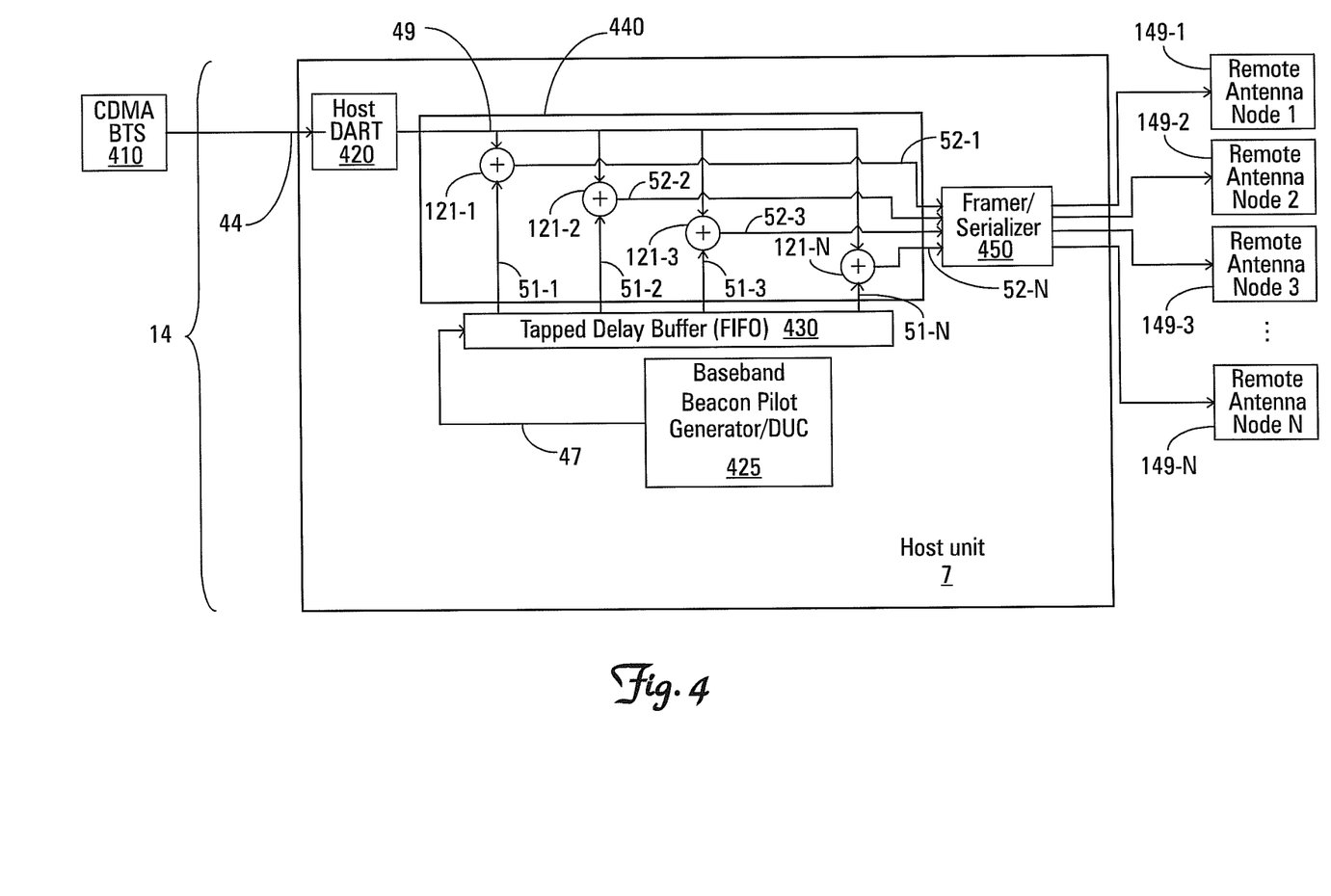

FIG. 4 is an embodiment of a DAS 14 to feed remote antenna nodes 149(1-N) with simulcast traffic and non-simulcast beacons in accordance with the present invention. In this embodiment, the beacon pilot generator 425 is a baseband beacon pilot generator integrated with a digital up-converter to output digital intermediate frequency (IF) samples to the delay buffer 430.

The DAS 14 is communicatively coupled to a CDMA base station 410. The DAS 14 includes a host unit 7, and the remote antenna nodes 149(1-N) communicatively coupled to the host unit 7 via respective optical fibers 60(1-N). The host unit 7 includes a host RF digitizer 420, a delay buffer 430, a summing circuit 440, and a framer/serializer 450. The summing circuit 440 is similar in structure and function to the summing circuit 240 as described above with reference to FIG. 2. The host RF digitizer 420 is also referred to herein as a host digital-analog radio transceiver (DART) 420.

The host RF digitizer 420 receives CDMA RF base station signals for simulcast CDMA-traffic-bearing channels from the CDMA base station 310 via communication link 44. The host RF digitizer 420 converts the RF signals to digital samples for CDMA-traffic-bearing channels. The digital samples for CDMA-traffic-bearing channels are output from the host RF digitizer 420. The summing circuit 440 is communicatively coupled to receive the digital samples that are output from the host RF digitizer 420 via link or trace line 49.

The baseband beacon pilot generator 425 is communicatively coupled to output CDMA-digital intermediate frequency (IF) samples to the delay buffer 430 via link or trace line 47. At the delay buffer 430, the CDMA-digital-beacon-pilot samples are digitally delayed to synthesize samples of pilot signals having different timing offsets (e.g., PN offsets). The delay buffer 430 sends CDMA-digital-beacon-pilot samples having different timing offsets to the summing circuit 440 via different links or trace lines 51(1-N).

The summing circuit 440 adds the CDMA-digital-beacon-pilot samples having different timing offsets to the digital samples for CDMA traffic bearing signals received from the host RF digitizer 420 to form the composite simulcast-plus-uniquely-offset-beacon-pilot CDMA samples. The composite simulcast-plus-uniquely-offset-beacon-pilot CDMA samples are sent to the framer/serializer 450 via the links or trace lines 52(1-N). The framer/serializer 450 routes each composite simulcast-plus-uniquely-offset-beacon-pilot CDMA sample streams to an associated one of the remote antenna nodes 149(1-N) communicatively coupled to the framer/serializer 450.

FIG. 5 is an embodiment of a DAS 15 to feed remote antenna nodes 149(1-N) with simulcast traffic and non-simulcast beacons in accordance with the present invention. In this embodiment, the beacon pilot generator is an external beacon pilot generator 527, which includes a baseband beacon pilot generator 525, a digital up-converter 526, and a delay buffer 530. The DAS 15 is communicatively coupled to a CDMA base station 510 and an external beacon pilot generator 527. The DAS 15 includes a host unit 8 and the remote antenna nodes 149(1-N) communicatively coupled to the host unit 8 via respective optical fibers 60(1-N).

The baseband beacon pilot generator 526 outputs digital baseband samples to the digital up-converter 526 via link 43. The digital up-converter 526 outputs digital IF samples to the delay buffer 530. The delay buffer 530 receives the digital IF samples output from the digital up-converter 526 and outputs CDMA-digital-beacon-pilot samples having different pseudo-noise offsets to the host unit 8.

The host unit 8 includes a host RF digitizer 520, a summing circuit 540, and a framer/serializer 550. The CDMA-digital-beacon-pilot samples are received at the summing circuit 540, which simultaneously outputs the composite simulcast-plus-uniquely-offset-beacon-pilot CDMA samples to the framer/serializer 550. The framer/serializer 550 routes each composite simulcast-plus-uniquely-offset-beacon-pilot CDMA sample stream to an associated one of the remote antenna nodes 149(1-N) communicatively coupled to the framer/serializer 550.

FIG. 6 is an embodiment of a DAS 16 to feed remote antenna nodes 149(1-N) with simulcast traffic and non-simulcast beacons in accordance with the present invention. The DAS 16 is communicatively coupled to a digital CDMA base station 610 and a baseband beacon pilot generator 625. The DAS 16 includes a host unit 9 and the remote antenna nodes 149(1-N) communicatively coupled to the host unit 9 via respective optical fibers 60(1-N). The host unit 9 includes a first digital up-converter 521, a second digital up-converter 626, a delay buffer 630, a summing circuit 640, and a framer/serializer 650. The baseband beacon pilot generator 625 outputs digital baseband samples to host unit 9. In one implementation of this embodiment, the baseband beacon pilot generator 625 is a digital signal processor 625 configured to synthesize a digital beacon pilot.

In this embodiment, the base station 610 of FIG. 6 is a digital CDMA base station 610 that outputs CDMA digital samples. This is different from the RF base stations 111-510 of FIGS. 1-5, which output RF CDMA signals. The first digital up-converter 521 receives the CDMA digital base station signals from the digital base station 610 and outputs digital samples for CDMA-traffic-bearing channels to the summing circuit 640. The second digital up-converter 626 receives digital baseband samples from the baseband beacon pilot generator 625 via link 43 and outputs digital IF samples to the delay buffer 630.

The delay buffer 630 receives the digital IF samples and outputs CDMA-digital-beacon-pilot samples having different timing offsets to the summing circuit 640. The summing circuit 640 forms composite simulcast-plus-uniquely-offset-beacon-pilot CDMA samples by summing the digital samples for CDMA-traffic-bearing channels with the CDMA-digital-beacon-pilot samples having different timing offsets. The framer/serializer 650 routes each of the composite simulcast-plus-uniquely-offset-beacon-pilot CDMA sample streams to an associated remote antenna node 149(1-N) in a distributed antenna system 16 wherein remote antenna nodes 149(1-N) are fed simulcast traffic and non-simulcast beacons from the digital base station 610 and the baseband beacon pilot generator 625.

Figure 7:
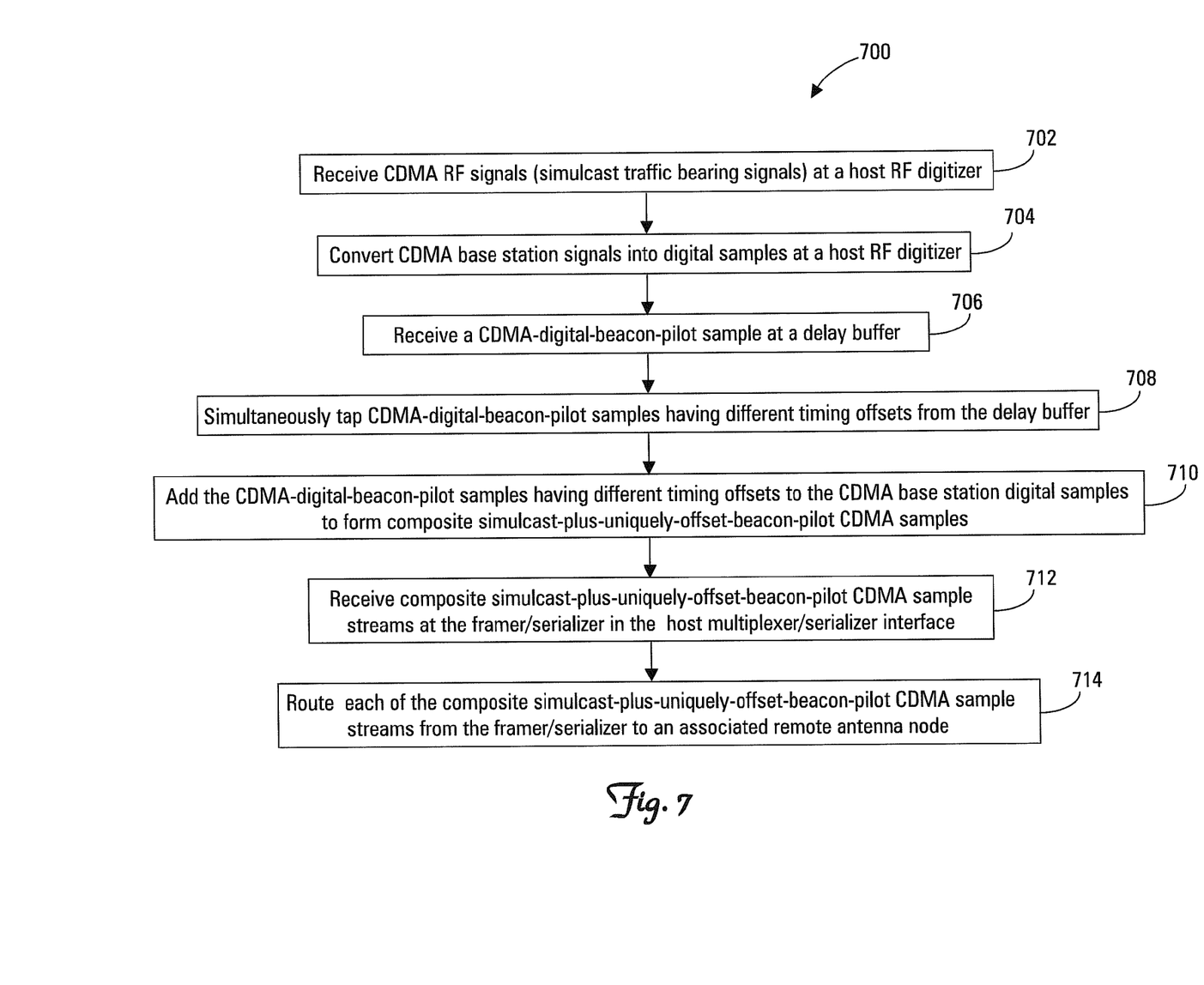
FIG. 7 is a method to distribute simulcast CDMA-traffic-bearing channels together with non-simulcast CDMA-digital-beacon-pilot samples having different timing-offsets using a single beacon pilot generator in accordance with the present invention.

Each beacon pilot generator and the associated base station described herein are configured to generate and to broadcast the composite simulcast-plus-uniquely-offset-beacon-pilot CDMA samples to an associated remote antenna node in a distributed antenna system. FIG. 7 is a method 700 to distribute simulcast CDMA-traffic-bearing channels together with non-simulcast uniquely-offset-beacon-pilot CDMA samples using a single beacon pilot generator that is applicable an RF base station (FIGS. 1-5). Method 700 can be implemented by other DAS systems that include other types of beacon pilot generator as is understandable to one of skill in the art upon reading and understanding this document.

CDMA RF signals are received at a host RF digitizer from a base station (block 702). The CDMA RF signals are simulcast traffic bearing signals. CDMA base station signals (i.e., the CDMA RF simulcast traffic bearing signals) are converted into digital samples for traffic bearing channels at the host RF digitizer (block 704). CDMA-digital-beacon-pilot samples are received at a delay buffer (block 706). In one implementation of this embodiment, the CDMA radio frequency beacon pilot is received from a CDMA radio frequency beacon pilot generator at a second host RF digitizer (FIG. 2). In this case, the second host RF digitizer converts the CDMA radio frequency beacon pilot into a CDMA-digital-beacon-pilot sample and sends the CDMA-digital-beacon-pilot sample to the delay buffer.

CDMA-digital-beacon-pilot samples having different timing offsets are simultaneously tapped from the delay buffer (block 708). The CDMA-digital-beacon-pilot samples having different timing offsets are added to the CDMA base station digital samples to form composite simulcast-plus-uniquely-offset-beacon-pilot CDMA samples (block 710). Composite simulcast-plus-uniquely-offset-beacon-pilot CDMA sample streams are received at the framer/serializer (block 712). The framer/serializer routes each of the composite simulcast-plus-uniquely-offset-beacon-pilot CDMA sample streams to an associated remote antenna node (block 714). For example, the first-beacon-pilot CDMA sample stream is routed by the framer/serializer to a first remote antenna node and a second-beacon-pilot CDMA sample stream is routed by the framer/serializer to a second remote antenna node.

It is to be noted that the number of pilot beacon offsets does not necessarily equal the number of remotes. In some embodiments, the composite simulcast-plus-uniquely-offset-beacon-pilot CDMA sample is output to subset of the remote nodes, while the other the remote nodes do not receive the composite simulcast-plus-uniquely-offset-beacon-pilot CDMA sample streams. In other embodiments, a pilot beacon with the same offset is added for transmission to more than one remote node.

A number of embodiments of the invention defined by the following claims have been described. Features shown specific to one embodiment may be combined with, or replace, features shown in other embodiments. As is understandable to one skilled in the art upon reading and understanding this document, various combinations of the interface between the CDMA base station and the host unit and the location of the beacon pilot generator can be implemented without departing from the spirit and scope of the claimed invention. Accordingly, other embodiments are within the scope of the following claims.

What is claimed is:

1. A distributed antenna system to feed remote antenna nodes with simulcast traffic and non-simulcast beacons, the distributed antenna system comprising:
   a host radio frequency (RF) digitizer to input code division multiple access (CDMA) base station signals for simulcast CDMA-traffic-bearing channels and to output digital samples;
   a delay buffer communicatively coupled to input the samples output from a beacon pilot generator and to output digitally delayed CDMA-digital-beacon-pilot samples having different pseudo-noise offsets;
   a summing circuit to add the CDMA-digital-beacon-pilot samples having different pseudo-noise offsets to the digital samples input from the host RF digitizer to form composite simulcast-plus-uniquely-offset-beacon-pilot CDMA samples; and
   a framer/serializer communicatively coupled to input the composite simulcast-plus-uniquely-offset-beacon-pilot CDMA samples and to route the down-link composite simulcast-plus-uniquely-offset-beacon-pilot CDMA samples for distribution to an associated remote antenna node in the distributed antenna system.

2. The distributed antenna system of claim 1, wherein the beacon pilot generator is a CDMA RF beacon pilot generator, and wherein the host RF digitizer is a first host RF digitizer, and wherein the first host RF digitizer inputs CDMA RF base station signals from a base station and outputs digital samples for CDMA traffic bearing signals, and wherein the communication system further includes a second host RF digitizer to input CDMA RF beacon pilot samples from the CDMA RF beacon pilot generator and to output CDMA-digital-beacon-pilot samples.

3. The distributed antenna system of claim 1, wherein each of the remote antenna nodes is communicatively coupled to the framer/serializer via an associated optical fiber, wherein at least one of the remote antenna nodes receives, via the associated optical fiber, a composite simulcast-plus-uniquely-offset-beacon-pilot CDMA sample stream.

4. The distributed antenna system of claim 1, wherein the beacon pilot generator is a baseband beacon pilot generator, the communication system further comprising a digital up-converter to input digital baseband samples output from the baseband beacon pilot generator and to output digital intermediate frequency (IF) samples to the delay buffer.

5. The distributed antenna system of claim 1, further comprising:
   the beacon pilot generator, wherein the beacon pilot generator is a baseband beacon pilot generator integrated with a digital up-converter to output digital intermediate frequency (IF) samples to the delay buffer.

6. The distributed antenna system of claim 1, wherein at least one of the remote antenna nodes receives, from a host unit housing the framer/serializer, an associated composite simulcast-plus-uniquely-offset-beacon-pilot CDMA sample stream.

7. The distributed antenna system of claim 1, further comprising:
   the remote antenna nodes; and
   optical fibers each communicatively coupled to an associated one of the remote antenna nodes.

8. The distributed antenna system of claim 1, wherein the beacon pilot generator is a digital signal processor configured to synthesize a digital beacon pilot.

9. A distributed antenna system to feed remote antenna nodes with simulcast code division multiple access (CDMA) traffic and non-simulcast beacon pilots, the distributed antenna system comprising:
   a first digital up-converter to input CDMA digital base station signals from a digital base station and to output digital samples for CDMA-traffic-bearing channels;
   a second digital up-converter to input digital baseband samples from a baseband beacon pilot generator and to output digital intermediate frequency (IF) samples;
   a delay buffer communicatively coupled to input the digital IF samples from the second digital up-converter and configured to output CDMA-digital-beacon-pilot samples having different timing offsets; and
   a summing circuit to form down-link composite simulcast-plus-uniquely-offset-beacon-pilot CDMA samples by summing the digital samples for CDMA-traffic-bearing channels with the CDMA-digital-beacon-pilot samples having different timing offsets, wherein each down-link composite simulcast-plus-uniquely-offset-beacon-pilot CDMA sample is distributed to an associated one of the remote antenna nodes in the distributed antenna system.

10. The distributed antenna system of claim 9, further comprising a framer/serializer configured to route each down-link composite simulcast-plus-uniquely-offset-beacon-pilot CDMA sample to the associated one of the remote antenna nodes.

11. The distributed antenna system of claim 10, wherein each of the remote antenna nodes is communicatively coupled to the framer/serializer via an associated optical fiber.

12. The distributed antenna system of claim 10, wherein at least one of the remote antenna nodes is communicatively coupled to receive, from a host unit housing the framer/serializer, an associated composite simulcast-plus-uniquely-offset-beacon-pilot CDMA sample stream.

13. The distributed antenna system of claim 9, further comprising:
   the remote antenna nodes; and
   optical fibers communicatively coupled to the remote antenna nodes.

14. The distributed antenna system of claim 9, wherein the baseband beacon pilot generator is a digital signal processor configured to synthesize a digital beacon pilot.

15. A method to distribute simulcast code division multiple access (CDMA)-traffic-bearing channels together with non-simulcast CDMA-digital-beacon-pilot samples having different timing-offsets using a single beacon pilot generator, the method comprising:
   inputting CDMA radio frequency signals from a base station at a host radio frequency digitizer;
   converting CDMA base station signals into digital samples for traffic bearing channels at the host RF digitizer;
   inputting CDMA-digital-beacon-pilot samples at a delay buffer;
   simultaneously tapping CDMA-digital-beacon-pilot samples having different timing offsets from the delay buffer;
   adding the CDMA-digital-beacon-pilot samples having the different timing offsets to the CDMA base station digital samples to form down-link composite simulcast-plus-uniquely-offset-beacon-pilot CDMA samples;
   inputting composite simulcast-plus-uniquely-offset-beacon-pilot CDMA sample streams at a framer/serializer; and
   routing each of the composite simulcast-plus-uniquely-offset-beacon-pilot CDMA sample streams from the framer/serializer to an associated remote antenna node in a distributed antenna system.

16. The method of claim 15, wherein the host RF digitizer is a first host RF digitizer, and wherein the inputting the CDMA digital beacon pilot at the delay buffer comprises:
   inputting a CDMA radio frequency beacon pilot from a CDMA radio frequency beacon pilot generator at a second host RF digitizer;
   converting the CDMA radio frequency beacon pilot into the CDMA-digital-beacon-pilot samples at the second host RF digitizer; and
   outputting the CDMA-digital-beacon-pilot samples to the delay buffer.

17. A host unit to feed remote antenna nodes in a distributed antenna system with simulcast traffic and non-simulcast beacons, the host unit comprising:
   a host radio frequency (RF) digitizer to input code division multiple access (CDMA) base station signals for simulcast CDMA-traffic-bearing channels and to output digital samples;
   a summing circuit to add CDMA-digital-beacon-pilot samples having different pseudo-noise offsets to the digital samples input from the host RF digitizer to form down-link composite simulcast-plus-uniquely-offset-beacon-pilot CDMA samples; and
   a framer/serializer configured to distribute each composite simulcast-plus-uniquely-offset-beacon-pilot CDMA sample to an associated remote antenna node in the distributed antenna system;
   a delay buffer communicatively coupled to input samples output from a beacon pilot generator and to output digitally delayed CDMA-digital-beacon-pilot samples having the different pseudo-noise offsets, the beacon pilot generator configured to output digital baseband samples; and
   a digital up-convertor to input the digital baseband samples and to output digital intermediate frequency samples to the delay buffer.

18. A host unit to feed remote antenna nodes in a distributed antenna system with simulcast traffic and non-simulcast beacons, the host unit comprising:
   a host radio frequency (RF) digitizer to input code division multiple access (CDMA) base station signals for simulcast CDMA-traffic-bearing channels and to output digital samples;
   a summing circuit to add CDMA-digital-beacon-pilot samples having different pseudo-noise offsets to the digital samples input from the host RF digitizer to form down-link composite simulcast-plus-uniquely-offset-beacon-pilot CDMA samples; and
   a framer/serializer configured to distribute each composite simulcast-plus-uniquely-offset-beacon-pilot CDMA sample to an associated remote antenna node in the distributed antenna system, wherein the summing circuit inputs the CDMA-digital-beacon-pilot samples having the different pseudo-noise offsets from an external beacon pilot generator, the external beacon pilot generator including:
   a baseband beacon pilot generator to output digital baseband samples;
   a digital up-converter to input the digital baseband samples from the baseband beacon pilot generator and to output digital intermediate frequency (IF) samples to a delay buffer; and
   the delay buffer communicatively coupled to input the digital IF samples output from the digital up-converter and configured to output the CDMA-digital-beacon-pilot samples having the different pseudo-noise offsets to the summing circuit.

* * * * *